(12) United States Patent
Kohira et al.

(10) Patent No.: US 6,628,480 B2
(45) Date of Patent: Sep. 30, 2003

(54) MAGNETIC HEAD SLIDER HAVING OPTIMIZED RATIO OF NEGATIVE PRESSURE RECESS TO FRONT STEP BEARING

(75) Inventors: Hidekazu Kohira, Odawara (JP); Masaaki Matsumoto, Fujisawa (JP); Kiyoshi Hashimoto, Odawara (JP); Masayoshi Endo, Odawara (JP); Akio Takakura, Odawara (JP); Yoshinori Takeuchi, Ishioka (JP); Shinsuke Higuchi, Odawara (JP); Akira Iida, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/365,838

(22) Filed: Aug. 3, 1999

(65) Prior Publication Data

US 2002/0135941 A1 Sep. 26, 2002

(30) Foreign Application Priority Data

Aug. 4, 1998 (JP) ............................................. 10-220749

(51) Int. Cl.$^7$ ................................................. G11B 5/60
(52) U.S. Cl. ............................... 360/235.6; 360/235.7; 360/236.1; 360/236.3
(58) Field of Search ........................... 360/235.5–236.3

(56) References Cited

U.S. PATENT DOCUMENTS

| 5,704,715 | A |   | 1/1998 | Chang et al. ................ 384/12 |
| RE35,800 | E | * | 5/1998 | Chapin ........................ 360/103 |
| 5,777,825 | A | * | 7/1998 | Dorius ........................ 360/103 |
| 5,872,686 | A | * | 2/1999 | Dorius et al. ............... 360/103 |
| 6,021,020 | A | * | 2/2000 | Itoh et al. ................... 360/103 |
| 6,023,394 | A | * | 2/2000 | Ito et al. ..................... 360/103 |
| 6,055,128 | A | * | 4/2000 | Dorius et al. ............... 360/103 |
| 6,069,769 | A | * | 5/2000 | Dorius et al. ............... 360/103 |
| 6,125,005 | A | * | 9/2000 | Lee et al. .................... 360/103 |

FOREIGN PATENT DOCUMENTS

| JP | 6-325530 | 11/1994 |
| JP | 6-333354 | 12/1994 |

* cited by examiner

*Primary Examiner*—Jefferson Evans
(74) *Attorney, Agent, or Firm*—Mattingly, Stanger & Malur, P.C.

(57) ABSTRACT

A magnetic head slider for sliding on a magnetic disk includes a leading edge, a trailing edge, an air bearing surface having a front step bearing of submicron depth made from the leading edge, and a rail surface made from the front step bearing. A negative pressure recess which is more profound than the front step bearing is made from the rail surface, and a side step bearing having a depth identical with the front step bearing is made from the rail surface. The ratio of the depth R of the recess to the depth δS of the front step bearing is R/δs>5.

12 Claims, 11 Drawing Sheets

MAGNETIC HEAD SLIDER HAVING OPTIMIZED RATIO OF NEGATIVE PRESSURE RECESS TO FRONT STEP BEARING

BACKGROUND OF THE INVENTION

This invention concerns magnetic head sliders (the sliders is not contacting but flying when said sliders drive on magnetic disks in this specification), which reduce head slider flying height (in the following, only flying height) in the high altitudes, when flying height over magnetic disk full face of magnetic head slider in the flatland low altitudes is approximately equalized, and concerns a magnetic disk unit using it.

It is important to narrow flying height defined as a clearance between a magnetic disk which rotates and a magnetic head slider in order to attempt high recording density of the magnetic disk apparatus. It is also desired that flying height is approximately equalized over the magnetic disk full face.

Narrowing of flying height increases the possibility of contacting the magnetic head to the magnetic disk and the magnetic head slider crashes, and there is the danger of destroying record information on the magnetic disk when both contact conditions are very inferior.

Therefore, from the viewpoint of the improvement in the recording density, decreasing flying height of the magnetic head slider is wanted, and the contradictory demand is wanted from the viewpoint of the reliability of the magnetic disk apparatus.

Laid open 6-325530 and laid open 6-333354 are examples of the conventional technology whose flying height is approximately equalized over the magnetic disk full face. In the laid open 6-325530, a positive pressure slider equalizes flying height over a magnetic disk full face approximately by using a shallow step bearing of 0.7 μm or less. Laid open 6-333354 a negative pressure slider equalizes flying height over a magnetic disk full face approximately by using a combination of barreled side rail with the cross rail of magnetic head slider which is postponed in the cross-direction.

(1) Dispersion of flying height by processing dispersion (slight difference between the sliders which made up) of magnetic head slider, (2) lowering of flying height by the seek operation, (3) lowering of flying height by atmospheric pressure lowering in the highland, etc. must be respectively reduced in order to narrow flying height of magnetic head slider, while the reliability of the magnetic disk apparatus is kept.

Especially, flying height lowers by the increase of the aerial mean free path (the length which the air molecules advance during the collisions between air moleculars) which is working fluid e.g. air of the magnetic head slider, when the magnetic disk apparatus is used in the highland, if it says about (3) in addition. Moreover, the effect on the reliability of the magnetic disk apparatus which is affected by the lowering of flying height caused by the lowering of atmospheric pressure is great, because magnetic head slider will keep be operated at flying height which always lowers.

Then, it is an important problem that the lowering quantity of flying height in the highland is to be reduced as less as possible and the lowering quantity is to be maintained equivalent over magnetic disk full face in the flatland to say noting of equalizing quantity of flying height (the levitation profile) over magnetic disk full face in the flat ground, as the narrowing of flying height promotes.

Laid open 6-325530 showed a positive pressure slider and laid open 6-333354 showed a negative pressure slider, both of them equalizes flying height over the magnetic disk full face in the flatland approximately, and can reduce flying height change by the processing dispersion and seek operation. However analyzed by the present inventors, the improvement on the above points was desired until now, without considering the flying height lowering in the highland at all.

SUMMARY OF THE INVENTION

This invention considered for the request like the above, the purpose of this invention is that the lowering effect of flying height in the highland (high altitude) is to be reduced and the lowering quantity (effect) is to be maintained equal or uniform over the magnetic disk full face in the flatland (low altitude), when the levitation profile in the flatland is approximately equalized, and a magnetic head slider in which to fix the levitation lowering quantity approximately is possible and magnetic disk apparatus using it.

As the features of this invention is as follows. In order to solve above subjects, in magnetic head slider which comprises with leading edge and air bearing surface and trailing edge. The front step bearing with depth of the submicron that said air bearing surface was made from said leading edge in the continuity. The rail level made from this the front step bearing in the continuity. Recess which is more profound than said front step bearing made in the continuity-from this rail level. Side step bearing with the depth which is identical with said front step bearing made in the continuity from the said rail level. Magnetic head slider which makes that the ratio of depth R of said recess and depth δ s of said front step bearing is R/δ s>5 as being negative pressure slider.

And, the ratio of depth R of said recess and depth δ s of said front step bearing is R/δ s>5 in this slider which having magnetic head slider and magnetic disk and spindle motor, and in the magnetic disk apparatus in which largest peripheral speed which is determined from diameter of said magnetic disk and rotational frequency of the said spindle motor is 20 m/s or less, said magnetic head slider is magnetic head slider which having leading edge and air bearing surface and trailing edge. Negative pressure slider which having side step bearing with the depth which is identical with said bearing that said air bearing surface was made in the continuity from the front step bearing of submicron made from said leading edge in the continuity with the depth and rail level made from this bearing in the continuity and recess which is more profound than said bearing made in the continuity from this rail level and said rail level. The ratio of depth R of aforesaid recess and depth δ s of said front step bearing was made to be R/δ s>5, and again, depth δ s of said front step bearing was made small from 200 nm.

In addition, magnetic disk apparatus in which largest peripheral speed that it having magnetic head slider and magnetic disk and spindle motor and determines from diameter of said magnetic disk and rotational frequency of the said spindle motor is 60 m/s or less, said magnetic head slider is magnetic head slider which having leading edge and air bearing surface and trailing edge. Negative pressure slider which having side step bearing with the depth which is identical with said bearing that said air bearing surface was made in the continuity from the front step bearing of submicron made from said leading edge in the continuity with the depth and rail level made from this bearing in the continuity and recess which is more profound than said bearing made in the continuity from this rail level and said rail level. The ratio of depth R of aforesaid recess and depth δ s of said front step bearing was made to be R/δ s>5, and again, depth δ s of said front step bearing and side step bearing was made to be 400 nm or less over 200 nm.

DESCRIPTION OF THE EMBODIMENTS

Execution form of this invention is explained by the reference of the following, drawing.

Figure 1:
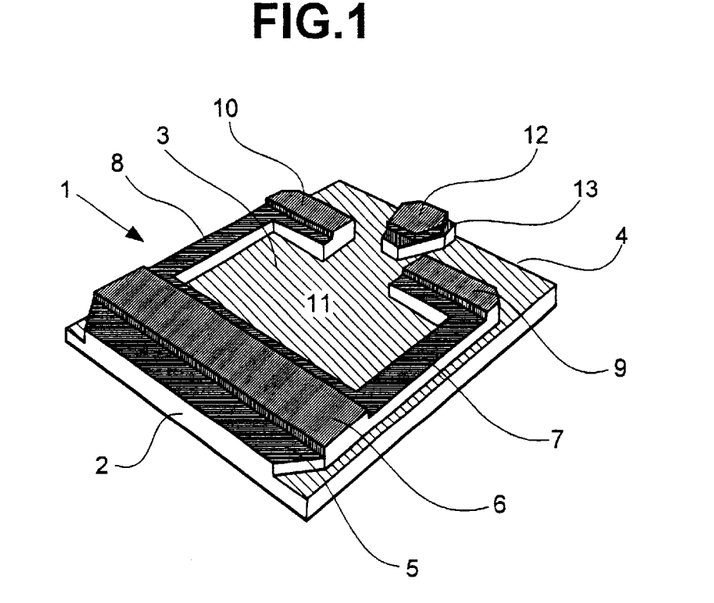
FIG. 1 is a strabismus figure which shows the first embodiment of the magnetic head slider by this invention.
Figure 2:
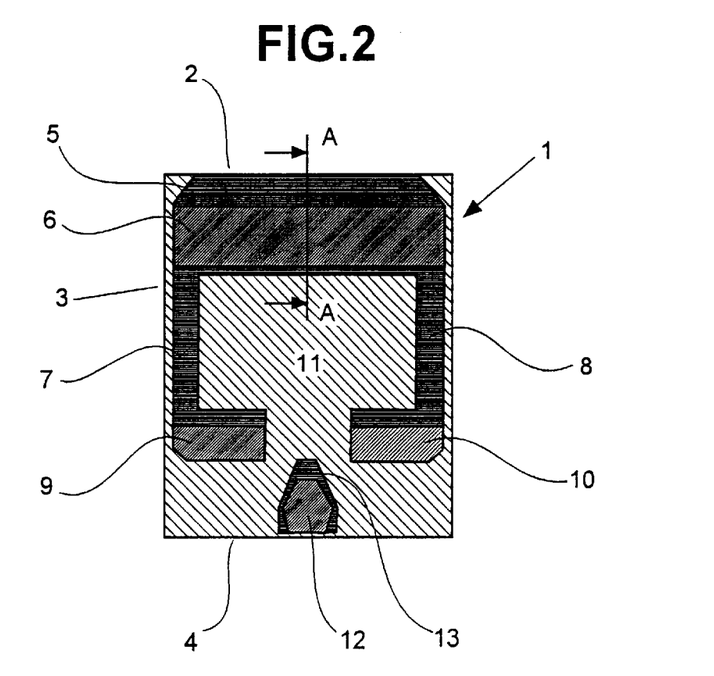
FIG. 2 is a plan figure thereof.
Figure 3:
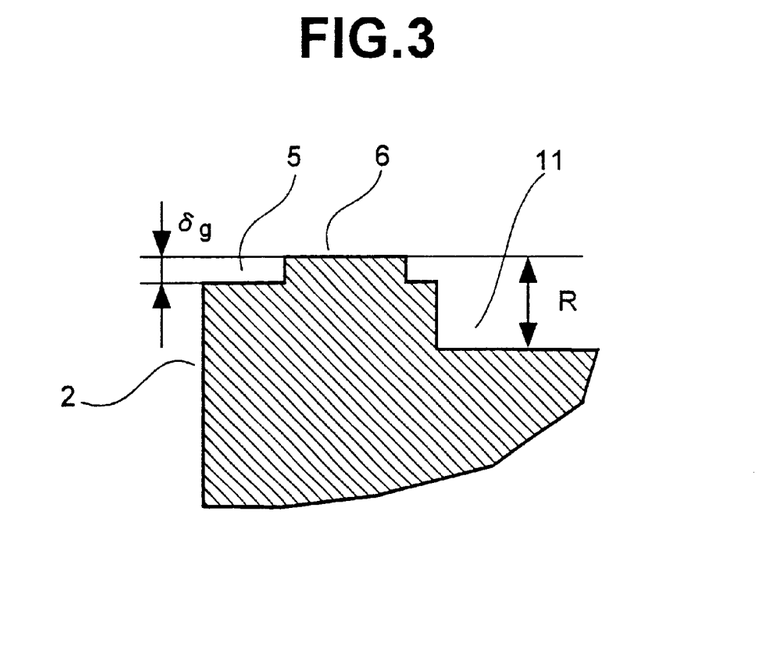
FIG. 3 is cross section taken on line A—A in FIG. 2.

Magnetic head slider 1 has leading edge 2, air bearing surface 3 and trailing edge 4. Air bearing surface 3 was formed here in, front step bearing 5 continuing from the leading edge 2, rail surface 6 in continuing from this front step bearing 5, paired side step bearings 7, 8 with the same depth as the front step bearing 5, and paired side pads 9, 10 continuing from the trailing edge sides of the side step bearings 7, 8. Negative pressure recesses 11 are surrounded by the rail surface 6, the side step bearings 7, 8, center pad 12 formed near the trailing edge 4, and center step bearing 13 with the same depth as the front step bearing 5 and formed to surround center pad 12.

The length of magnetic head slider 1 is 1.25 mm, and the width is 1.0 mm. The length of the front step bearing 5 is 0.1 mm and the depth δ s of the front step bearing 5 standardized by rail surface 6 is 0.25 μm. The length of rail surface 6 is 0.13 mm, the width is 0.96 mm, and width is about 7.4 times for the length. The depth of the paired side step bearings 7, 8 and the center step bearing 13 are identical with front step bearing 5 and 0.25 μm, as was mentioned earlier. The paired side pads 9,10 are located closer to the trailing edge 4 than the center in the slider length direction, and the width is larger than the length as is the case with the rail surface 6. The depth R of negative pressure recess 11, standardized by rail surface 6, is 1.6 μm. The center pad 12 has the magnetic head (not illustrated).

Figure 4:
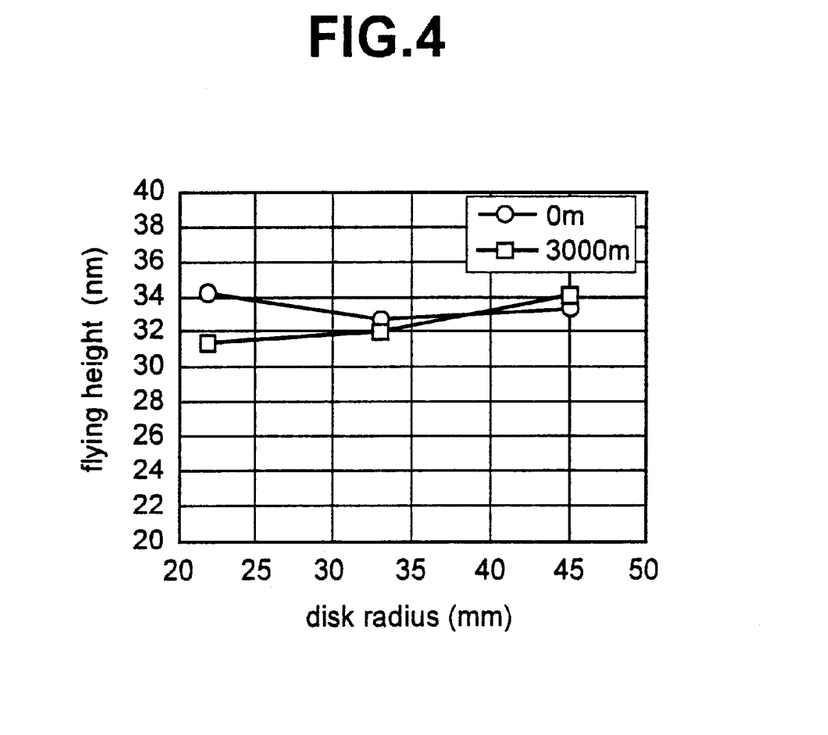
FIG. 4 is a levitation profile in flatland and highland of the magnetic head slider.

FIG. 4 shows a levitation profile of the magnetic head slider 1 in flatland (0 m) and highland (3000 m) calculated under the condition of 3.5 inches of magnetic disk diameter and 7200 rpm of rotational frequency of the spindle motor.

The flying height in the highland can be drastically reduced in the inner circumference about 2.5 nm and in the middle circumference about 0.5 nm, besides the amount of change of flying height over magnetic disk full face in the flatland can be decreased very much with about 1 nm, as proved from this FIG. 4. In the outer circumference, flying height increases in highland compared with flatland.

As it has already been described, it is desired that the levitation profile in the flatland is equalized in order to increase a memory capacity, and to reduce the lowering of flying height by the atmospheric pressure in the highland in order to keep the reliability of apparatus.

According to this invention, the levitation profile in the flatland can be equalized, as mentioned before, the levitation lowering in the highland can be reduced, and the reason is explained in the following.

Figure 5:
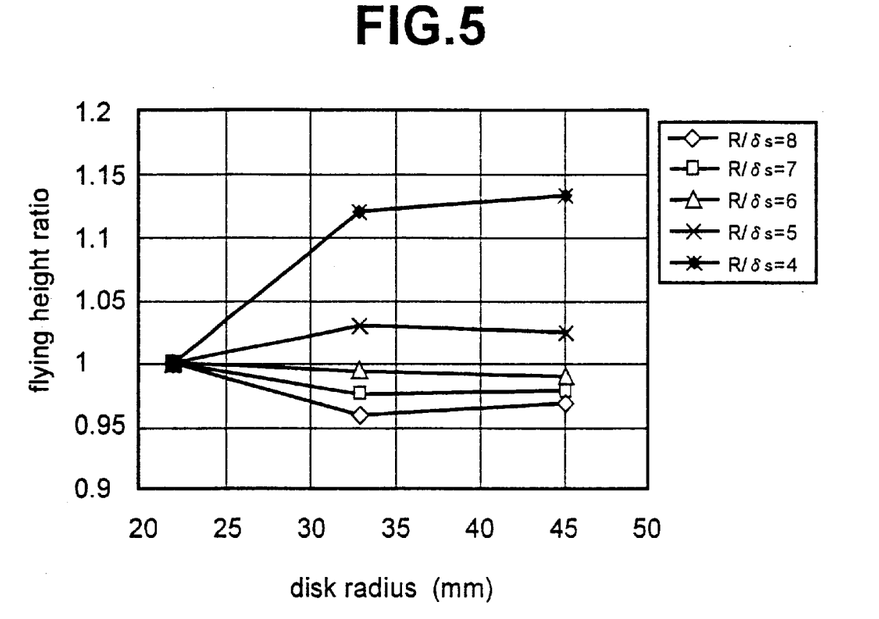
FIG. 5 shows the effect of the ratio of recess depth and depth of the front step bearing on the levitation profile in magnetic head slider of the first execution form.
Figure 6:
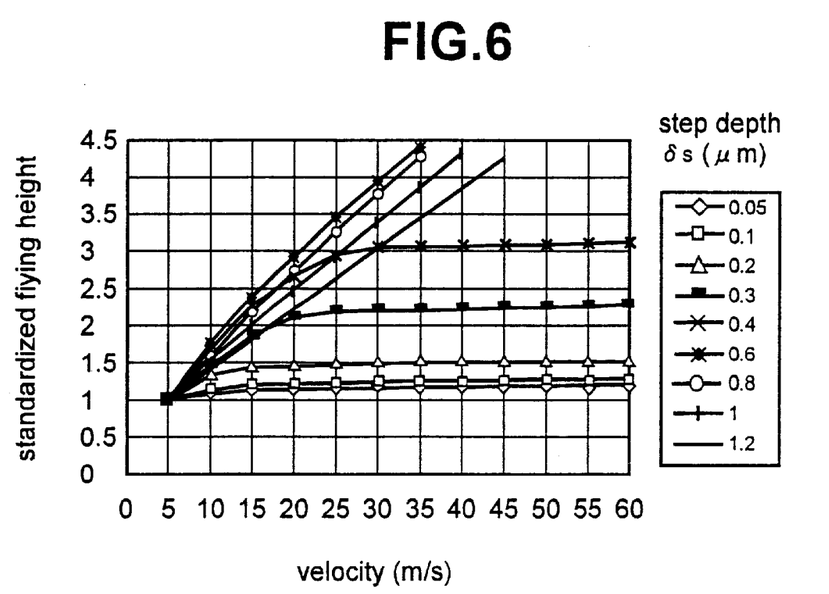
FIG. 6 shows the effect between peripheral speed of the depth and flying height of the front step bearing on the relation in magnetic head slider of the first execution form.

To begin with, how the relationship between depth δ s of front step bearing 5 and depth R of recess 11 may be set in order to equalize the levitation profile, is explained using FIG. 5 and FIG. 6.

FIG. 5 shows the result of the levitation profile calculated to make depth R of recess 11 constant at 1.6 μm in magnetic head slider 1, and the depth δ s of front step bearing 5 changed, and the ratio R/δ s was made to be a parameter, and it shows the effect of ratio R/δ on the levitation profile. Standardizing flying height of middle and outer circumference using flying height in the inner circumference in either case is shown. It is proved from this FIG. 5 that the flying height over the inner and outer circumference, that is, the levitation profile can be fixed approximately by the ratio R/δ larger than at least 5.

FIG. 6 shows the aspect of the change of flying height for the peripheral speed in magnetic head slider of 1 with depth δ s of front step bearing 5 a parameter, and shows the effect by the depth δ s on the relationship between peripheral speed and flying height. Flying height at each peripheral speed has been standardized in either case at flying height of the 5 m/s peripheral speed. It is proved from the FIG. 6 that the aspect of the change of flying height for the peripheral speed greatly differs by the size of this depth δ s of front step bearing 5.

Generally, in 2.5 inches magnetic disk diameter magnetic disk apparatus, the rotational frequency of the spindle motor is about 600 rpm at most, and the largest peripheral speed is about 20 m/s or less. Therefore, it is necessary to make the depth δ s of magnetic head slider 1 of front step bearing 5 used for the magnetic disk apparatus of magnetic disk having diameter of 2.5 inches in which largest peripheral speed is 20 m/s or less, to be 200 nm or less in order to equalize the levitation profile.

In the meantime, in 3.5 inches magnetic disk diameter magnetic disk apparatus, the rotational frequency of the spindle motor is about 12000 rpm at most, and the largest peripheral speed is about 60 m/s or less. Therefore, it is necessary to make depth δ s of magnetic head slider of 1 of front step bearing 5 used for the magnetic disk apparatus of magnetic disk having diameter of 3.5 inches in which largest peripheral speed is 60 m/s or less, to be 400 nm or less in order to equalize the levitation profile.

Next, the reason for drastically reducing lowering quantity of flying height with the atmospheric pressure lowering in the highland in comparison with the case of conventional magnetic head slider according to first execution form of this invention is explained in detail using FIG. 7~FIG. 10.

Figure 7:
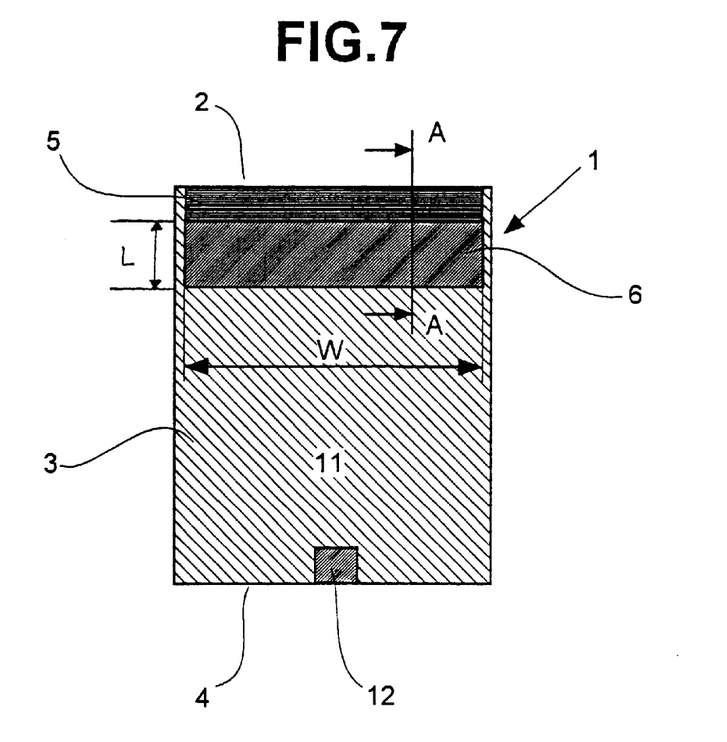
FIG. 7 is a plan figure of the magnetic head slider basic form.
Figure 8:
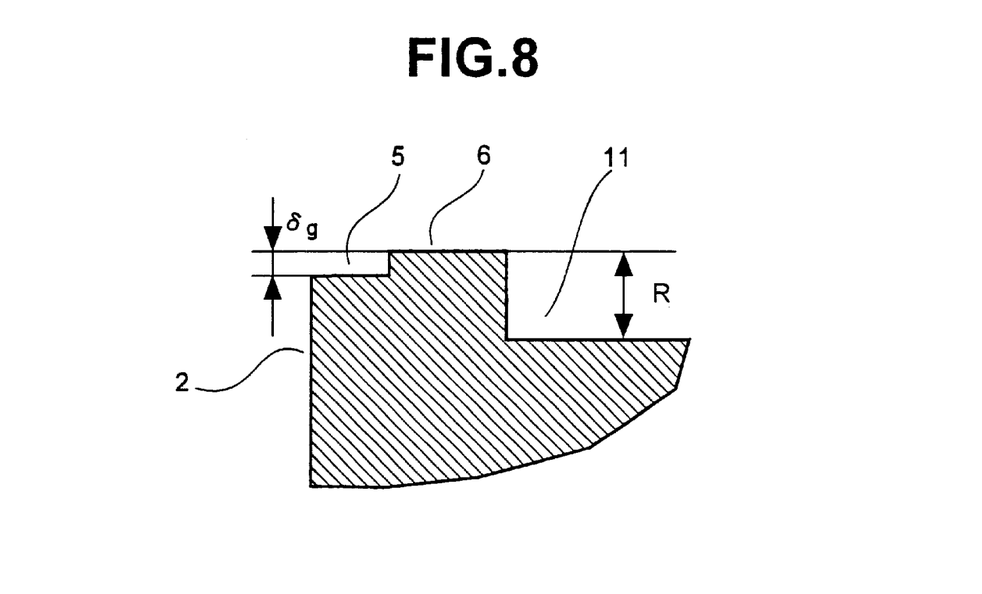
FIG. 8 is cross section taken on line A—A in FIG. 7.

FIG. 7 is the plan figure which shows designed magnetic head slider basic form in order to examine the condition to reduce flying height lowering by the atmospheric pressure lowering, and FIG. 8 is an A—A line cross section regard FIG. 7.

The corresponding numerals of the magnetic head slider 1 (FIG. 1~FIG. 3) is used in these FIGS. 7 and 8. For this basic form, there is no side step bearing 7, 8, and by forming front step bearing 5 and rail surface 6 in leading edge 2 sides, the negative pressure force arises in negative pressure recess 11 of rail surface 6 established rear. Ratio (L/W) of length and width is changed by using fixing length L of rail surface 6 is 0.35 mm, and varying width W.

Figure 9:
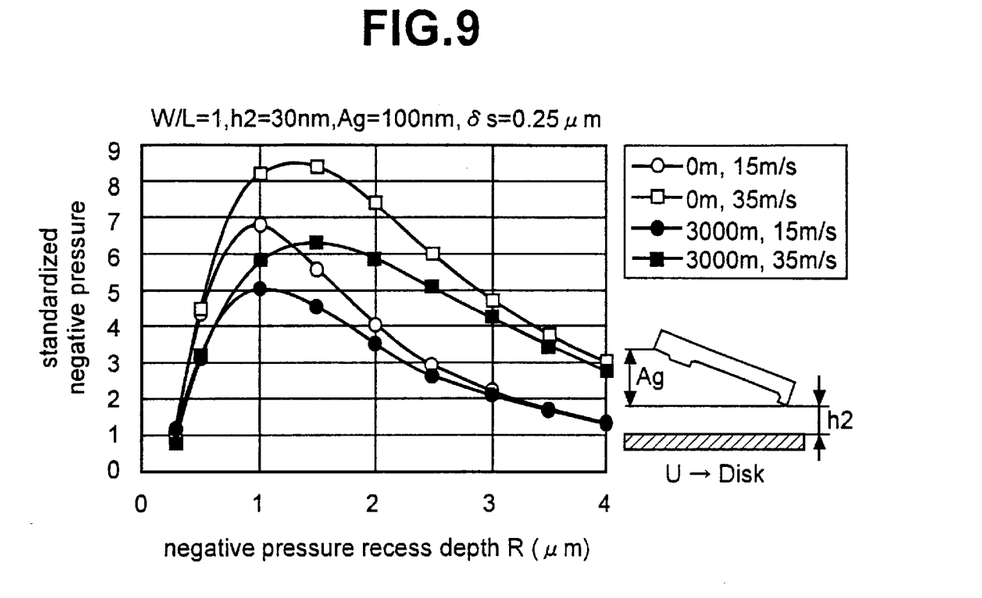
FIG. 9 shows the effect between altitude and recess depth and normalized negative pressure force of the peripheral speed on the relation.

About the relationship between the depth R of negative pressure recess 11 and standardized negative pressure force, a result of calculating altitude and peripheral speed as a parameter, in other words, the effect of altitude and peripheral speed on the relationship between the depth R of negative pressure recess and standardized negative pressure force is shown in FIG. 9

The calculation condition fixed that the flying height h2 is 30 nm, Ag which showed flying attitude is 100 nm and the depth of front step bearing 5 is 0.25 μm, and the length L and the width W of rail surface 6 is identical (L/W=1). Altitudes are 0 m and 3000 m, and peripheral speeds are 15 m/s and 35 m/s. 15 m/s peripheral speed and 35 m/s almost respectively correspondent to peripheral speed of 3.5 inches magnetic disk which rotates at 7200 rpm in record region inner circumference and in the outer circumference.

Standardized negative pressure force of the vertical line of FIG. 9 is the value of standardized negative pressure force which arose using the negative pressure force under each condition that the depth R of recess 11 is 0.3 μm, the altitude is 0 m and the peripheral speed is 15 m/s. It is proved that the negative pressure force has the maximal value even in either condition for recess depth R.

The most important result of FIG. 9 is that the decreased level of the negative pressure force is the biggest, if the altitude rises when negative pressure recess depth R in which negative pressure force becomes the maximal value. Flying height must lower, because positive pressure which arises in rail surface 6 and center padding 12 is decreased by the rising of attitude. However, when flying height reversely rises, the negative pressure force decreases. That is to say, to reduce flying height lowering of magnetic head slider 1 in the highland mostly is by choosing the recess depth R in which the negative pressure force greatly decreases by attitude, concretely, the recess depth R in which the negative pressure force becomes the maximal value.

In the meantime, in the case recess 11 is shallower or reversely more profound than the maximal value, the flying height decreases largely by the rising of altitude, as the difference of size of the negative pressure force in the flatland and size of the negative pressure force in the highland decreases. The increasing of the change of flying height by processing dispersion of recess depth R occurs, when recess 11 is shallow, since the change of negative pressure force for recess depth R is steep.

It is desired to choose the adequate value, that is, near the negative pressure recess depth R whose negative pressure force becomes the maximal value for reducing flying height change by altitude. In the peripheral speed range in the example in FIG. 9, recess depth R is 2 μm or less, because there is almost no change of the negative pressure force by the altitude difference in case of 15 m/s peripheral speed, if the recess depth R is bigger than 2 μm.

If the recess depth R is 1 μm or less, the change of the negative pressure force by recess depth R is big, and the change of flying height by the processing dispersion increases. Therefore, it is desirable to have the recess depth R to be about 1 μm~2 μm.

It appeared to be clear that the lowering flying height of magnetic head slider 1 which originates from the altitude can be reduced, but the problem in this situation is that the value of recess depth R whose negative pressure force becomes a maximum dramatically changes by the peripheral speed generally. Concretely, the value of the recess depth R whose negative pressure force becomes a maximum becomes deep, as the peripheral speed become faster.

Figure 10:
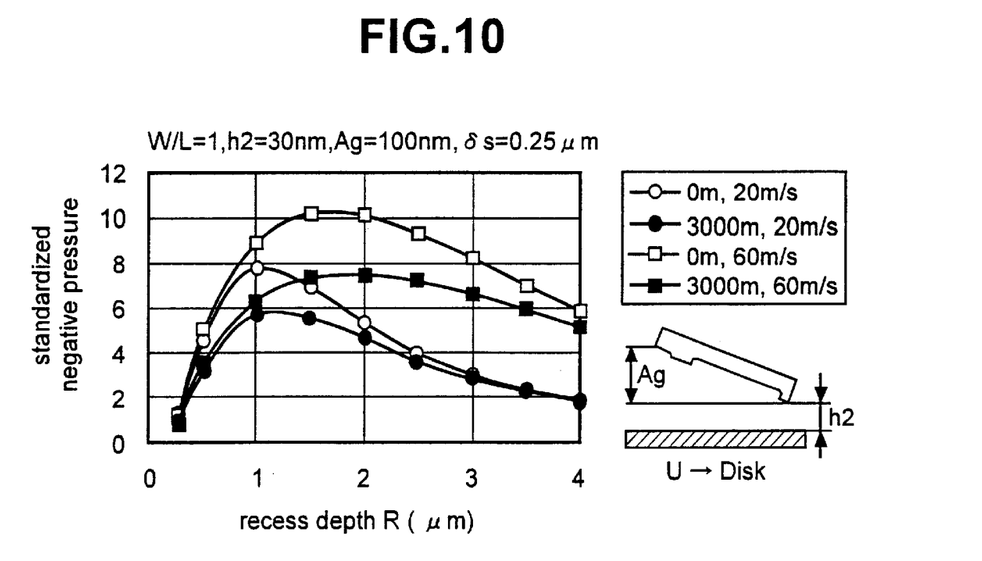
FIG. 10 is a figure between altitude and recess depth and normalized negative pressure force of peripheral speed of FIG. 9 on the relation which shows the effect, at the peripheral speed unlike the case.

FIG. 10 shows the result of the same examination as FIG. 9 at 20 m/s and 60 m/s peripheral speeds.

In the magnetic disk apparatus of magnetic disk having 2.5 inches diameter, the largest peripheral speed is 20 m/s or less at most, as mentioned above, and recess depth R is at most to be 1 μm or less in order to reduce lowering quantity of flying height by the atmospheric pressure lowering. In the magnetic disk apparatus of magnetic disk having 3.5 inches diameter, the largest peripheral speed is 60 m/s or less at most, and recess depth R is at most to be 2.5 μm or less in order to reduce lowering quantity of flying height by the atmospheric pressure lowering.

In FIG. 9, there is a 0.2 μm difference between recess depth R in which the negative pressure force becomes a maximum in 35 m/s peripheral speed is about 1.2 μm, and recess depth R in which the negative pressure force becomes a maximum in 15 m/s peripheral speed is about 1 μm. In order to equalize the levitation profile using a negative pressure slider, as the quickening of the peripheral speed, that is, the negative pressure force would be wanted to increase with magnetic head slider 1 moving to the outer circumference of the magnetic disk. Therefore, the levitation profile is easy to be equalized to chose the value of the recess depth R:1.2 μm which make negative pressure force to become a maximum in the 35 m/s peripheral speed not to chose the value of the recess depth R:1 μm which make negative pressure force to become a maximum in the 15 m/s peripheral speed, because the difference in the negative pressure force by the difference in the peripheral speed can be increased. However, from the viewpoint of the equalizing of the levitation profile, the levitation lowering quantity by the altitude in the outer circumference can be reduced, when recess depth R in which the negative pressure force becomes a maximum under the peripheral speed condition in the outer circumference of the magnetic disk is chosen, and the problem that the lowering quantity of flying height increases in comparison with the outer circumference in the inner circumference occurs. Magnetic head slider 1 recess depth R in which the negative pressure force becomes a maximum which can be almost equalized without basing on the peripheral speed, is required in order to prevent such problem.

Figure 11:
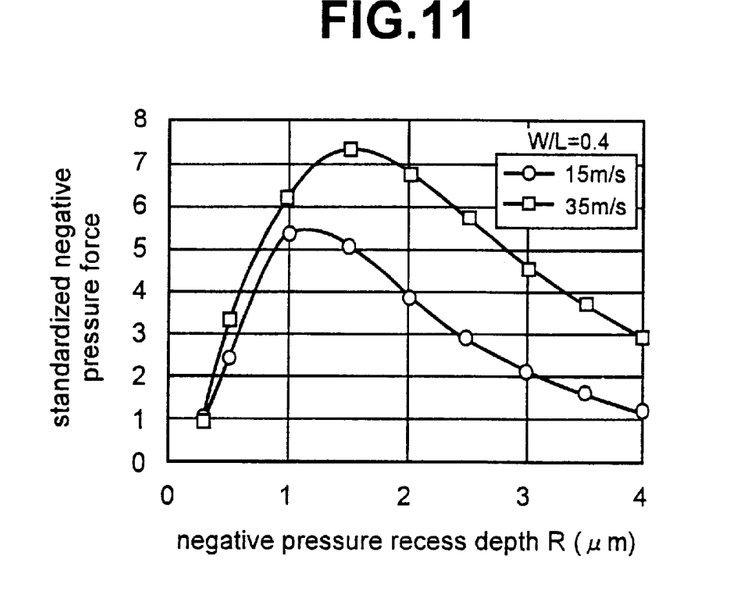
FIG. 11 shows the effect between length of rail level and recess depth and normalized negative pressure force of the ratio of the width on the relation on the peripheral speed which differs, on magnetic head slider basic form shown in FIG. 7.
Figure 12:
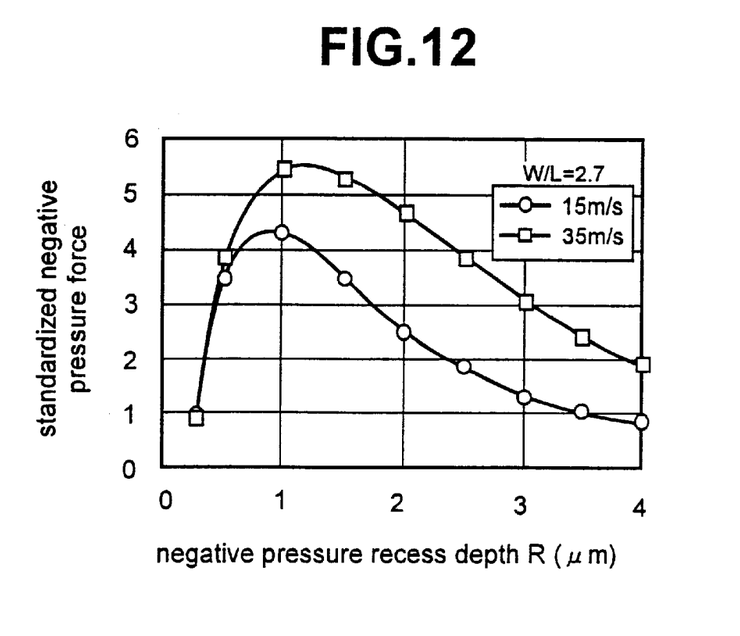
FIG. 12 shows the effect between the recess depth of the ratio and normalized negative pressure force on the relation on the peripheral speed which differs, on the case in which the ratio of length and width of the rail level differs on FIG. 11.
Figure 13:
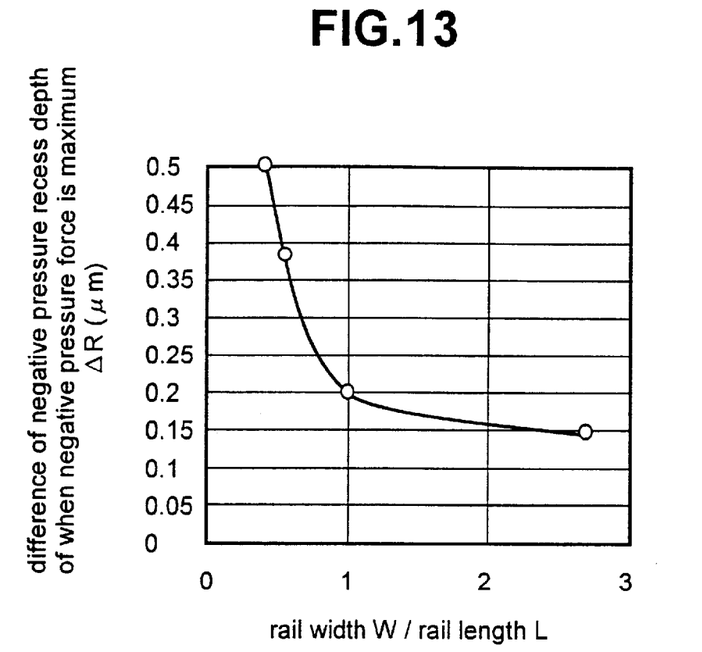
FIG. 13 shows the result of changing ratio W/L further in respect of the examination equal to explaining in FIG. 11 and FIG. 12.

Using FIG. 11~FIG. 13, the method for reducing the change by the peripheral speed of recess depth R in which the negative pressure force becomes a maximum was explained.

FIG. 11 is a figure that the effect on the relationship between recess depth R and standardized negative pressure force by the ratio W/L on magnetic head slider basic form shown in FIG. 7 was shown, when the flying height h2 is 30 nm, Ag which shows flying attitude is 100 nm, the depth of front step bearing 5 is 0.25 μm, and the ratio W/L of the length and width of rail surface 6 is 0.4. The parameter is a peripheral speed (15 m/s and 35 m/s).

FIG. 12 is a figure that the relationship between recess depth R and standardized negative pressure force on magnetic head slider basic form shown in FIG. 7 was shown, too, when the flying height h2 is 30 nm, Ag which shows flying attitude is 100 nm, the depth of front step bearing 5 is 0.25 μm, and the ratio W/L of the length and width of rail surface 6 is 2.7. The parameter is a peripheral speed (15 m/s and 35 m/s), too.

It is generated negative pressure force, when peripheral speed is 15 m/s on anyway of FIG. 11 and FIG. 12 on the vertical line, and when recess depth R are 0.3 μm, and negative pressure force which arose in each condition is standardized, was shown.

In comparison with FIG. 11 and FIG. 12, it is proved that the change by the peripheral speed of recess depth R in which the negative pressure force becomes a maximum decreases, as that is to say, it is a wide profile, as ratio W/L of length L and width W of rail level formed in leading edge 2 sides is bigger.

FIG. 13 shows the result of changing ratio W/L further in respect of the examination equal to explaining in FIG. 11 and FIG. 12, and it shows the relationship between superscription ratio W/L and difference in recess depth R in which the negative pressure force becomes a maximum.

The vertical line of FIG. 13 has shown difference ΔR of recess depth R in which the negative pressure force becomes a maximum in 15 m/s peripheral speed and recess depth R in which the negative pressure force becomes a maximum in 35 m/s peripheral speed. ΔR becomes small, as ratio W/L increases in order to do foregoing. Especially, it is proved that the value over 1, that is, rail level width W or over rail level length L is effective for the reduction in ΔR in respect of ratio W/L. This time, the effect of the peripheral speed for recess depth R in which the negative pressure force becomes maximal value decreases, and the levitation lowering quantity in the highland levitation profile in the inside and outside periphery of the magnetic disk can be reduced to say nothing of equalizing of the levitation profile in the flatland.

Figure 14:
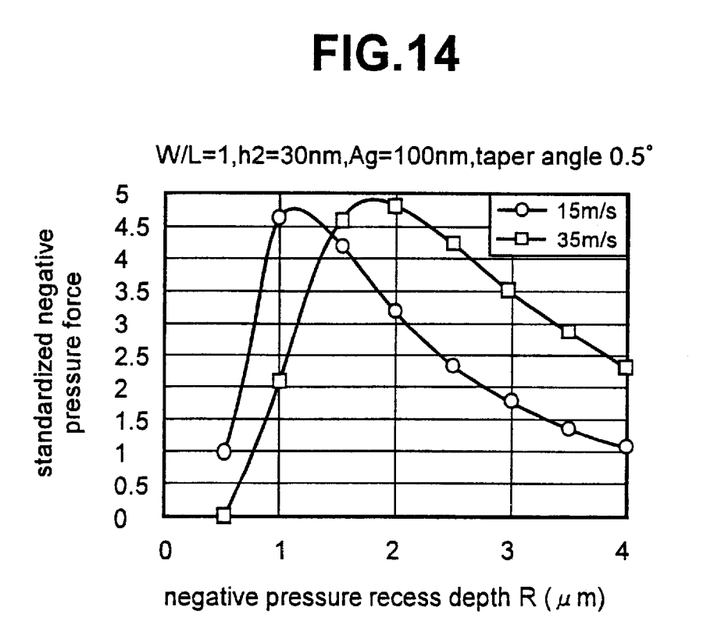
FIG. 14 shows the relationship between recess depth R and standardized negative pressure force in making to be a taper of the 0.5° angle in substituting the examination equal to explaining in FIG. 11 and FIG. 12.

And, it is explained using FIG. 14 that front step bearing 5 equipped the leading edge 2 sides is indispensable, in order to equalize the levitation profile in the flatland, and in addition, in order to reduce the flying height lowering in the highland.

FIG. 14 shows the relationship between recess depth R and standardized negative pressure force in making to be a taper of the 0.5° angle in substituting the examination equal to explaining in FIG. 11 and FIG. 12, with front step bearing 5, and it shows the effect of the taper with recess depth R on the standardized negative pressure force.

According to this FIG. 14, recess depth R in which the negative pressure force becomes a maximum further than the case of front step bearing 5 greatly changes by the peripheral speed, and it is proved that moreover, the size of maximal value of negative pressure force in 15 m/s peripheral speed and maximal value of negative pressure force in 30 m/s peripheral speed does not change almost. Therefore, it is difficult that the levitation profile is equalized, even if the change by the peripheral speed of recess depth R in which the negative pressure force becomes maximal value was able to be reduced, and even if it temporarily increased it of ratio W/L of width W and length L of rail levels 6. That is to say, recess depth R must be deepened than the case of front step bearing 5 in order to equalize the levitation profile in case of the taper, so that the negative pressure force may increase with the increase of the peripheral speed.

Therefore, it is difficult for the taper for reducing in addition, the lowering of flying height in the highland, when the levitation profile is equalized.

From the above result, front step bearing 5 of the submicron order is established in leading edge 2 sides, and width W of rail level 6 made from front step bearing 5 in the continuity is increased further than length L, and in addition, depth R of recess 11 which is located in trailing edge 4 sides from rail level 6 is made to be the depth in which the negative pressure force becomes the maximal value. By this, in reducing the lowering quantity of flying height in the highland more and more, when the levitation profile in the flatland is equalized, it is added, the difference of levitation lowering quantity in the inside and outside periphery of the magnetic disk can be also reduced.

As explained in FIG. 4, levitation lowering quantity in highland (3000 m) was able to be reduced on all magnetic disk positions at slightly 3 nm or less, when levitation profile in flatland (0 m) was equalized, and this magnetic head slider 1 was first execution form which is example of magnetic head slider designed based on such research result actually showed in FIG. 1~FIG. 3.

It is possible to minimize the lowering of magnetic head slider of flying height in the highland by choosing recess depth R in which the negative pressure force becomes a maximum, as it has explained until now. However, it is difficult that flying height of magnetic head slider is heightened, when large negative pressure force works. Generally, though it is possible that flying height is made to increase by increasing rail level product to which generate whether it decreases the load which suspension gives to magnetic head slider or positive pressure, various problems are produced in the handling of suspension, when the load is extremely decreased, and it becomes difficult that the levitation profile is equalized, when the rail level product is increased. For the reliability of the magnetic disk apparatus, in order to improve the recording density, it is more desirable that it is small for flying height of magnetic head slider, and not unnecessarily small way is desirable.

Figure 15:
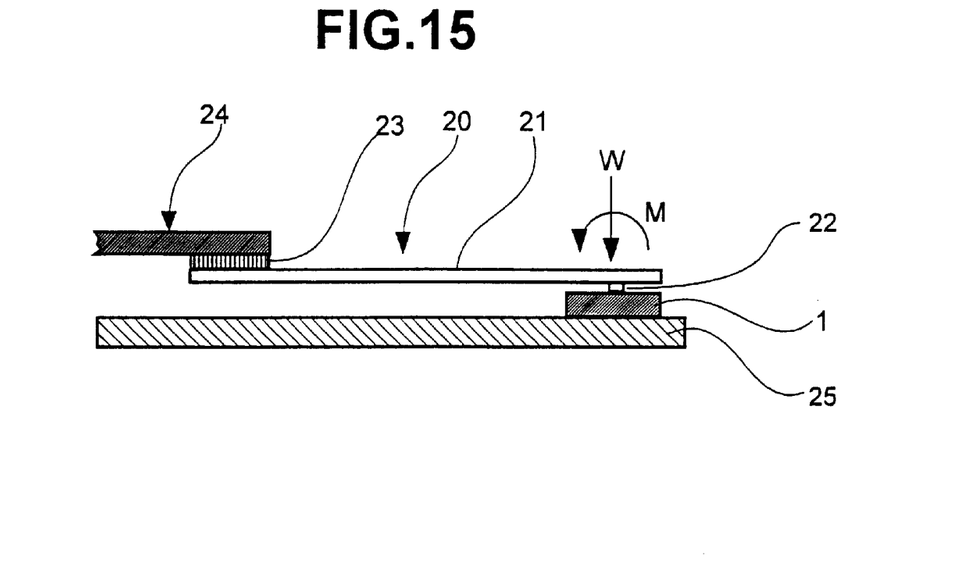
FIG. 15 is a part of side section view which shows pitch moment of the direction which pressed leading edge sides of magnetic head slider to magnetic disk by suspension for magnetic head slider of the first execution form would be added with load.

In the first execution form, the levitation profile was equalized, as said before, and recess depth R was made small with 1.6 μm in order to reduce the levitation lowering quantity in the highland. Besides, as a means for increasing the absolute value of flying height more and more, as indicated in FIG. 15. Pitch moment M of the direction which pressed leading edge 2 sides of magnetic head slider 1 to magnetic disk 25 by suspension 20 for magnetic head slider 1 of the first execution form would be added with load W. Concretely, 0.75 gf, pitch moment M were made to be 0.328 gfmm in respect of superscription load W.

Suspension 20 consists of load beam 21 and gimbal 22 and mount 23 here, and it is connected with carriage 24 in mount 23. Gimbal 22 can be realized by bending to the direction in which only angle minute decided from a pitch stiffness of gimbal 22 presses leading edge 2 sides of magnetic head slider 1 to magnetic disk 25 in order to add pitch moment M of the desire.

By adding pitch moment M like this using suspension 20, it is possible that flying height of magnetic head slider 1 increases, while the uniformity of the levitation profile was kept, when it was made to be recess depth R in which the negative pressure force becomes a maximum. Especially, flying attitude Ag increases, when rail level 6 in which the width was wide like the above-mentioned 1 execution form in leading edge 2 sides were established, when pitch moment M is not added. Therefore, flying attitude becomes small by adding pitch moment M, though air bearing stiffness formed in magnetic head slider 1 and between magnetic disks becomes small, and it is possible to increase air bearing stiffness, especially stiffness of the roll direction. And, the similar effect is obtained even in that instead, the load point of suspension 20 is shifted to leading edge 2 sides a pitch moment M.

Figure 16:
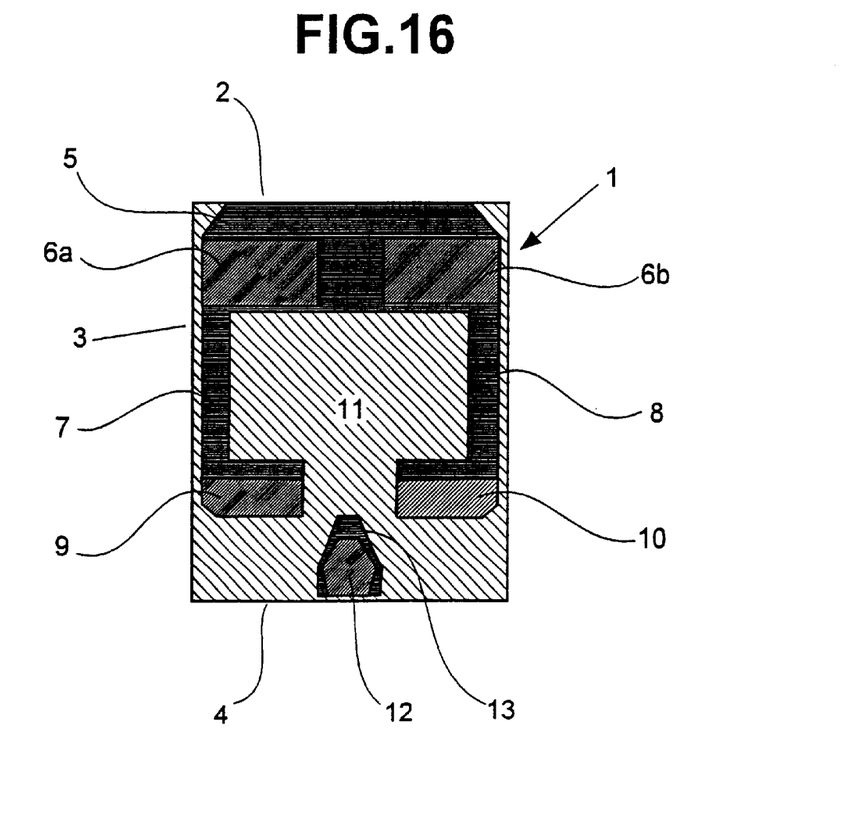
FIG. 16 is a plan figure which shows the second execution form of magnetic head slider by this invention.

FIG. 16 is a plan figure which shows the second execution form of magnetic head slider by this invention. The identical code was identically appended to the considerable part with magnetic head slider of the first execution form (FIG. 1~FIG. 3) in this FIG. 16.

In this second execution form, the width would increase for the length of rail level 6a and 6b, even if bisection (6a,6b) of rail level 6 has been done. According to this second execution form, by halving rail level 6, it is possible to improve air bearing stiffness of the roll direction further than the first execution form.

Figure 17:
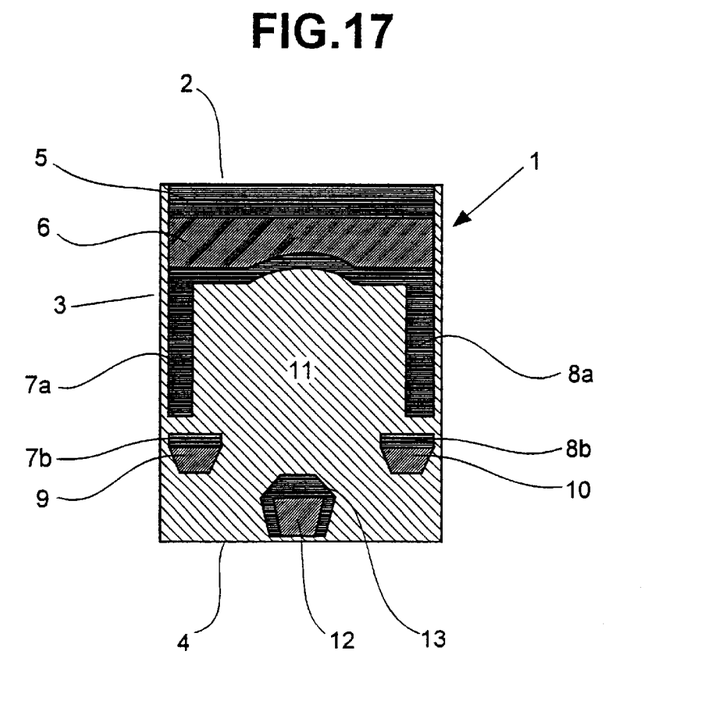
FIG. 17 is a plan figure which shows the third execution form of magnetic head slider by this invention

FIG. 17 is a plan figure which shows the third execution form of magnetic head slider by this invention. The identical code was identically appended to the considerable part with magnetic head slider 1 of the first execution form (FIG. 1~FIG. 3) in this FIG. 17.

In this second execution form, bisection (7a,7b, 8a,8b) has respectively been done in respect of paired side step bearing 7,8. According to this third execution form, by respectively halving side step bearing 7,8, the size of negative pressure force which arises in recess 11 can be adjusted, and the size of flying height can be fluctuated. And, it is possible to improve air bearing stiffness of the roll direction a little in comparison with the first execution form, because the positive pressure which arises in rail level 6 can be slightly divided, by thinning cross-direction center position of rail level 6 by limiting.

Figure 18:
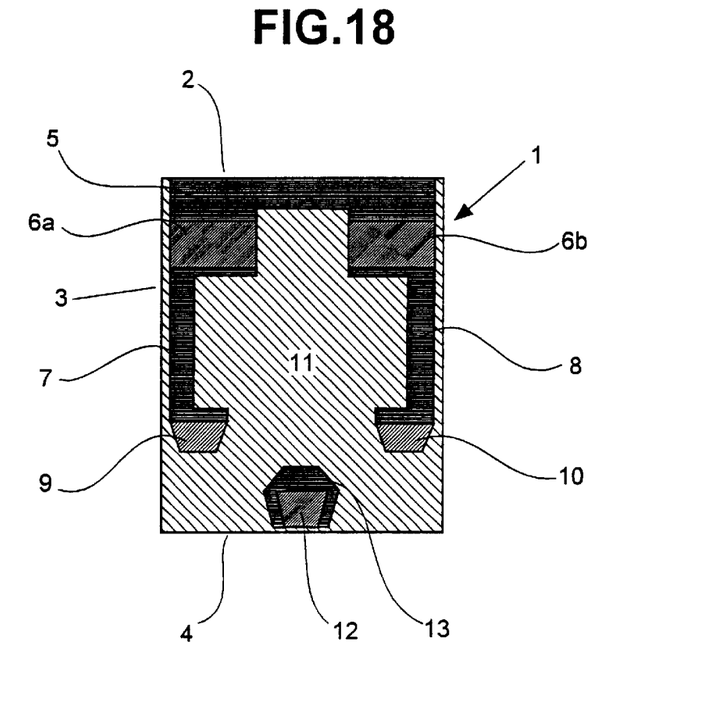
FIG. 18 is the plan figure which shows the fourth execution form of magnetic head slider by this invention.

FIG. 18 is the plan figure which shows the fourth execution form of magnetic head slider by this invention. The identical code was identically appended to the considerable part with magnetic head slider 1 of the first execution form (Figure of 1~FIG. 3) in this FIG. 16. In this fourth execution form, it has done bisection (6a,6b) of rail level 6, and the negative pressure force is increased further than the first execution form by adding recess area which is identical depth of recess 11 between 6a and 6b. Therefore, it is possible to improve air bearing stiffness of the roll direction more and more in comparison with first, second execution form.

Figure 19:
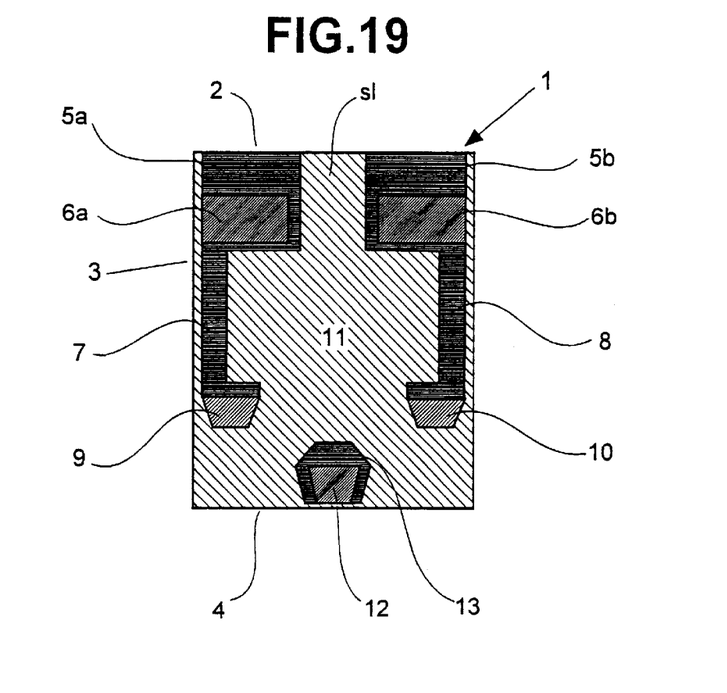
FIG. 19 is the plan figure which shows the fifth execution form of magnetic head slider by this invention.

FIG. 19 is the plan figure which shows the fifth execution form of magnetic head slider by this invention. The identical code was identically appended to the considerable part with magnetic head slider 1 of the first execution form (Figure of 1~FIG. 3) in this FIG. 19. In this fifth execution form, bisection (6a,6b) of rail level has been done, and in addition, thin slit s1 which is identical depth of recess 11 has been formed between 6a and 6b to leading edge 2. According to this fifth execution form, the size of negative pressure force which arises by slit s1 in recess 11 can be adjusted, and the size of flying height can be fluctuated.

Figure 20:
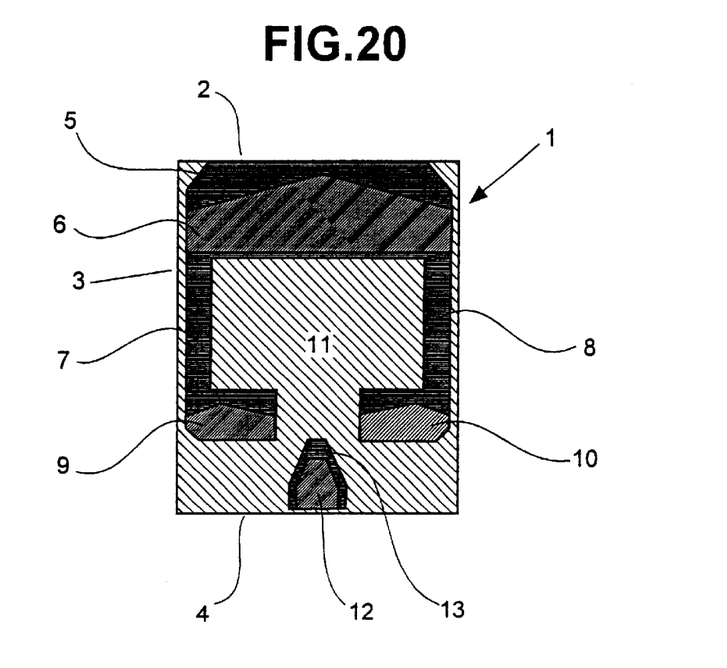
FIG. 20 is the plan figure which shows the sixth execution form of magnetic head slider by this invention.

FIG. 20 is the plan figure which shows the sixth execution form of magnetic head slider by this invention. The identical code was identically appended to the considerable part with magnetic head slider 1 of the first execution form (FIG. 1~FIG. 3) in this FIG. 20. In this sixth execution form, changing the boundary line of front step bearing 5 and rail level 6 not 1 straight line like the first execution form but 2 straight line which forms the obtuse angle in making the cross-direction center of magnetic head slider 1 to be a top. Similarly, the boundary between side step bearing 7,8 and side pad 9,10 was formed in 2 straight line which formed the obtuse angle in the top, as was illustrated. The possibility of going the foreign body which exists in magnetic disk apparatus of this sixth execution form using magnetic head slider 1 into between the rail level 6 and the magnetic disk can be reduced, if it is made to be such shape.

Figure 21:
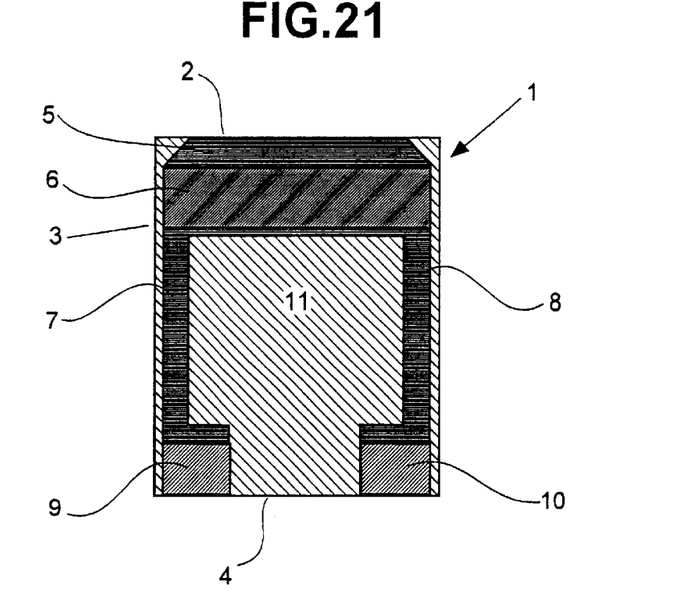
FIG. 21 is the plan figure which shows the seventh execution form of magnetic head slider by this invention.

FIG. 21 shows the seventh form of magnetic head slider by this invention. Paired side pads 9,10 have been formed to trailing edge 4 in the total rising, and it becomes the composition which has the magnetic head (it is not illustrated) for the side pad 9,10. Center padding 12 and center step bearing 13 have been omitted. According to this seventh form, there is a drastic spread in the area of recess 11 compared with the first form, to together increase pitch direction and air bearing stiffness of the roll, because the positive pressure is generated in the trailing edge 4 vicinity.

Figure 22:
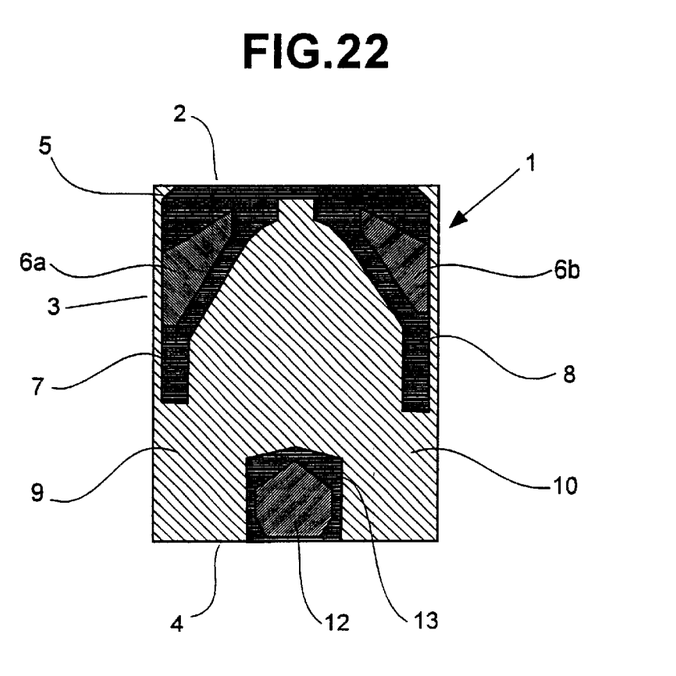
FIG. 22 is the plan figure which shows the eighth execution form of magnetic head slider by this invention.

FIG. 22 shows the eighth form of magnetic head slider by this invention. Paired side pad 9,10 were omitted. According to this, the adhesion to air bearing surface was reduced as to the possibility of going into a foreign body which exists in magnetic disk apparatus and producing gas from parts of the apparatus internal solidified can be also reduced using the magnetic head slider 1 into between rail level 6 and magnetic disk, because rail shape has always tilt angle for the air flow direction.

As explained above, according to this invention, it is effective that it reduces levitation lowering quantity with the atmospheric pressure lowering in the highland, when the levitation profile in the flatland is approximately equalized, and again, that it fixes levitation lowering quantity over magnetic disk full face approximately is possible.

What is claimed is:

1. A head slider for keeping a constant flying height, comprising:
   a leading edge;
   a trailing edge; and
   an air bearing surface formed from said leading edge, said air bearing surface including:
      a step bearing formed from said leading edge,
      a rail surface formed from said step bearing, and
      a negative pressure recess formed between said rail surface and said trailing edge, and
      a center pad formed from said trailing edge, said center pad having a length in an air flow direction and a width perpendicular thereto and perpendicular to the depth direction of said recess, wherein over at least part of the length of the center pad, the width of the center pad increases from a leading edge end of the center pad;
   wherein said step bearing has a depth $\delta s$ from said rail surface, said negative pressure recess has a depth R from said rail surface, and $R/\delta s \geq 5$.

2. A head slider according to claim 1, wherein $R/\delta s < 8$.

3. A head slider according to claim 1, wherein $\delta s \geq 400$ nm.

4. A head slider according to claim 1, wherein R is $1 \mu m \leq R \leq 2.5 \mu m$.

5. A head slider according to claim 1, further comprising:
   a side step bearing formed from said rail surface having a depth $\delta s$ from said rail surface.

6. A head slider according to claim 1, further comprising first and second side edges, and first and second side pads formed from said first and second side edges, respectively, wherein each of said first and second side pads has a length in the air flow direction and a width perpendicular thereto and perpendicular to the depth direction of said recess, and a ratio of width to length of each of said first and second side pads is greater than one.

7. A magnetic head slider for flying above a magnetic disk, comprising:
   a leading edge;
   an air bearing surface; and
   a trailing edge;
   said air bearing surface having a front step bearing with submicron depth from said leading edge in continuity rearward, a rail surface made from this front step bearing in continuity rearward, a negative pressure recess more deep than said front step bearing made in continuity from said rail surface, side step bearing with depth identical with said front step bearing made in continuity from the rail surface and said trailing edge made at an opposite side of said leading edge, and a center pad formed from said trailing edge, said center pad having a length in an air flow direction and a width perpendicular thereto and perpendicular to the depth direction of said recess, wherein over at least part of the length of the center pad, the width of the center pad increases from a leading edge of the center pad;
   wherein the ratio of depth R of said recess to depth $\delta s$ of said front step bearing is $R/\delta s \geq 5$.

8. A magnetic head slider according to claim 7, wherein each of said first and second side pads has a length in the air flow direction and a width perpendicular thereto and perpendicular to the depth direction of said recess, and a ration of width to length of each of said first and second side pads is greater than one.

9. A magnetic head slider according to claim 7, wherein $R/\delta s < 8$.

10. A magnetic head slider according to claim 7, wherein $\delta s \leq 400$ nm.

11. A magnetic head slider according to claim 7, wherein R is $1 \mu m \leq R \leq 2.5 \mu m$.

12. A magnetic head slider according to claim 7, further comprising:
   a side step bearing formed from said rail surface having a depth $\delta s$ from said rail surface.

* * * * *